US012630976B2

(12) United States Patent
Titoff

(10) Patent No.: US 12,630,976 B2
(45) Date of Patent: May 19, 2026

(54) METHOD AND APPARATUS FOR TREATING MIXTURES OF LIQUIDS AND SOLIDS

(71) Applicant: Matias Titoff, Kemi (FI)

(72) Inventor: Matias Titoff, Kemi (FI)

(73) Assignee: Lean Pulp Oy, Puhos (FI)

( * ) Notice: Subject to any disclaimer, the term of this patent is extended or adjusted under 35 U.S.C. 154(b) by 288 days.

(21) Appl. No.: 18/283,009

(22) PCT Filed: Mar. 23, 2022

(86) PCT No.: PCT/FI2022/050187
§ 371 (c)(1),
(2) Date: Sep. 20, 2023

(87) PCT Pub. No.: WO2022/200687
PCT Pub. Date: Sep. 29, 2022

(65) Prior Publication Data
US 2024/0167224 A1 May 23, 2024

(30) Foreign Application Priority Data

Mar. 25, 2021 (FI) ...................................... 20215340

(51) Int. Cl.
*D21C 9/18* (2006.01)
*B01D 33/073* (2006.01)
*B01D 33/48* (2006.01)
*B01D 33/60* (2006.01)
*B01D 33/62* (2006.01)
*C02F 11/121* (2019.01)
*D21C 9/02* (2006.01)
(Continued)

(52) U.S. Cl.
CPC ............. *D21C 9/18* (2013.01); *B01D 33/073* (2013.01); *B01D 33/48* (2013.01); *B01D 33/60* (2013.01); *B01D 33/62* (2013.01); *C02F 11/121* (2013.01); *D21C 9/02* (2013.01); *D21D 5/02* (2013.01); *D21D 5/06* (2013.01); *D21D 5/16* (2013.01); *D21D 5/22* (2013.01); *C02F 2103/28* (2013.01)

(58) Field of Classification Search
CPC ... D21C 9/02; D21C 9/06; D21C 9/18; D21D 5/05; D21D 5/06; D21D 5/16
See application file for complete search history.

(56) References Cited

U.S. PATENT DOCUMENTS

| | | | | |
|---|---|---|---|---|
| 772,192 | A | * | 10/1904 | Turner ..................... D21C 9/10 68/181 R |
| 3,241,676 | A | | 3/1966 | Neuville et al. |

(Continued)

FOREIGN PATENT DOCUMENTS

| | | | | |
|---|---|---|---|---|
| EP | 0055701 A1 | 7/1982 | | |
| EP | 0146641 A1 | * | 7/1985 | ............... D21D 5/16 |

(Continued)

*Primary Examiner* — Anthony Calandra
(74) *Attorney, Agent, or Firm* — Laine IP Oy

(57) ABSTRACT

According to an example aspect of the present invention, there is provided. an apparatus and a method for treating mixtures of liquids and solids. The apparatus comprises a casing and a rotor mounted inside the casing and having an inner volume delineated by an outer surface. The outer surface is provided with flow connections to the inner volume and configured to be rotated within the casing. The casing and the rotor are set in a vertical position.

17 Claims, 9 Drawing Sheets

(51) Int. Cl.
  *D21D 5/02*     (2006.01)
  *D21D 5/06*     (2006.01)
  *D21D 5/16*     (2006.01)
  *D21D 5/22*     (2006.01)
  *C02F 103/28*   (2006.01)

(56)           References Cited

U.S. PATENT DOCUMENTS

| | | | | |
|---|---|---|---|---|
| 3,394,809 A * | 7/1968 | Hunter | ..................... | D21D 5/06 |
| | | | | 210/415 |
| 3,478,679 A | 11/1969 | Bauserman | | |
| 3,506,562 A | 4/1970 | Coackley | | |
| 4,041,560 A | 8/1977 | Jacobsen | | |
| 4,446,788 A | 5/1984 | Molnar | | |
| 4,944,167 A | 7/1990 | Jacobsen et al. | | |
| 5,020,178 A | 6/1991 | Jacobsen | | |
| 2006/0070924 A1 * | 4/2006 | Fredriksson | ............. | D21D 5/16 |
| | | | | 162/55 |
| 2015/0283778 A1 | 10/2015 | Long | | |
| 2023/0068151 A1 * | 3/2023 | Ide | ........................... | D21C 9/02 |

FOREIGN PATENT DOCUMENTS

| | | | | | |
|---|---|---|---|---|---|
| SE | 435401 B | * | 9/1984 | ............... | D21C 9/18 |
| WO | WO9007968 A1 | | 7/1990 | | |
| WO | WO9200413 A1 | | 1/1992 | | |
| WO | WO9509039 A1 | | 4/1995 | | |
| WO | WO-9617996 A1 | * | 6/1996 | ............... | D21C 9/02 |
| WO | WO-9945193 A1 | * | 9/1999 | ............. | D21D 5/026 |
| WO | WO-2020193003 A1 | * | 10/2020 | ............. | D21D 5/026 |

* cited by examiner

METHOD AND APPARATUS FOR TREATING MIXTURES OF LIQUIDS AND SOLIDS

FIELD

This invention relates to treating mixtures comprising constituents in liquid and solid phase. More particularly, the invention relates to removing liquid from a liquid/solids mixture, washing the solids in a liquid mixture and separating higher density material from the liquid. In particular, the invention relates to thickening, washing and separating pulp in liquid mixtures.

BACKGROUND

In paper and pulp industry many of the process steps relate to mixing fibres with liquids and removing said liquid from the mixture. These process steps include, for example, dewatering of pulp, washing fibres in various suspensions and separating solid chemicals such as lye from liquids. There are several types of apparatuses currently in use, namely vacuum filters, pressure diffusers, atmospheric diffusers wash presses and drum displacers (DD-press). Leading manufacturers are Andritz and Valmet. The existing apparatuses are quite large when high output volume is needed and therefore expensive. Most of the structures have to be made of highly resistant material like stainless or acid resistant steel, which automatically leads to high costs.

Most commonly used apparatuses are wash press and DD-washer. Physical size, massive structures and efficiency issues have led to situation, where we have basically two equipment used: wash press and DD-washer (drum displacer). A wash press is a competitive equipment compared to DD washer for process stages, where washing efficiency demand is low. But for example in in brown stock/post oxygen stage washing more than one wash press may be needed. In wash press technology the pulp mixture is pressed mechanically. This means high loads. Massive rolls and other structures lead to expensive solutions. For example, in DD-washers the thickness of the filtration cake is 40-60 mm and the cake travels around a drum having a cross section of 2-6 m. The length of the drum may be over 10 m. The effective volume of such a large apparatus is low, leading to expensive process equipment solutions.

Pulp industry expands 3-4% early and new pulp mills are achieving better cost and environmental efficiency by making higher production capacity mills. This trend has led manufacturers to design and build bigger equipment by scaling up the existing technology. Scaling up the existing technology means much more massive and complex structures and high costs. New pulp mill fibre lines are mostly equipped with wash presses and Drum Displacers (DD-washer). This equipment has been developed to meet the demands on better washing efficiency and higher production rates. Other equipment (vacuum filters, production diffusers etc.) are not available to higher production levels because structural challenges has led to extremely expensive manufacturing costs. That is the reason why suppliers have focused to the main equipment: wash presses and DD-washers.

One alternative approach to existing apparatuses is disclosed in U.S. Pat. No. 3,241,676. The apparatus therein comprises a horizontal perforated drum that is rotated in a casing. The rotating drum and infeed speed of the treated pulp and liquid mixture cause a turbulent flow. Liquid is removed through the drum and concentrated fibre suspension is removed through openings and outlets in the wall of the casing.

SUMMARY OF THE INVENTION

The invention is defined by the features of the independent claims. Some specific embodiments are defined in the dependent claims.

According to a first aspect of the present invention, there is provided an apparatus for treating mixtures of liquids and solids, comprising a casing, a rotor mounted inside the casing and having an inner volume delineated by an outer surface provided with flow connections to the inner volume and configured to be rotated within the casing, wherein the casing and rotor are set in a vertical position According to a second aspect of the present invention, there is provided a method for treating mixtures of liquids and solids, comprising feeding said mixture inside a vertical casing, rotating a vertical perforated rotor within the casing, removing liquid from the mixture through the rotor and removing a fraction comprising solids from the casing.

According to third aspect of the invention, the casing and the outer surface of the rotor form an annular volume around the rotor.

According to a fourth aspect of the invention, there is provided an inlet for feeding the mixture to be treated into the casing at a first pressure, a first outlet configured for removing liquid from the casing at a pressure lower to the first pressure and a second outlet configured for removing a fraction comprising solids at a pressure lower to the first pressure.

According to a fifth aspect of the invention, there is provided an apparatus comprising at least one wash filtrate inlet at a distance from the inlet for feeding the mixture.

According to a sixth aspect of the invention, there is provided an apparatus wherein the rotor is composed of rotor modules comprising at least a pre-thickening module (26) and a washing module or a combined thickening and washing module.

According to a seventh aspect of the invention, the rotor comprises two superposed washing modules.

According to an eighth aspect of the invention, the outer surface of rotor modules is a straight cylinder.

According to a ninth aspect of the invention, the number of perforations in the rotor modules enlarge in the flow direction of the mixture to be treated from a higher pressure towards a lower pressure.

According to a tenth aspect of the invention, the casing is composed of casing modules and the lengths of the casing modules and rotor modules are configured to correspond with each other.

According to an eleventh aspect of the invention, the rotor modules are configured as straight cylinders and casing modules as cut cones that taper. in the flow direction of the mixture to be treated from a higher pressure towards a lower pressure.

According to a twelfth aspect of the invention, the solids in the mixture of solids and liquid is transferred within the casing by a pressure difference between the inlet and the second outlet.

EMBODIMENTS

Definitions

In the present context, the term "mixture" comprises compositions having at least one substituent in liquid phase and at least one substituent in solid phase.

This invention relates to dewatering of pulp, washing pulp with liquid and in general separating solids from liquid phase. The invention is particularly useful in washing and dewatering pulp. As the apparatuses currently in use are large, heavy and complex structures and therefore expensive compared to output volume, at least some embodiments provide solutions to one or more of these problems. Dewatering and washing is performed in a vertical casing comprising a vertical rotor within. The vertical positioning of the casing and rotor provide control of thickness of the pulp mixture along the length of the apparatus and rotating the rotor provides easy removal of liquid and keeps the liquid removal holes of the rotor free from plugging. The apparatus may be designed modular.

The various embodiments of the invention provide one or more benefits, for example output of the apparatus accomplished by at least some embodiments of the invention is improved compared to apparatuses presently in use as well as size and cost of the apparatus may be decreased. At least some of the technological solutions enabled by the invention allow building smaller structurally lighter and thereby cheaper apparatuses. The purchase investment is lower and decrease of need of materials more effective. Improved se of material resources support sustainable development and is more environmentally friendly. An apparatus for thickening mixtures can be provided and the apparatus may include one or several washing stages.

Figure 1:
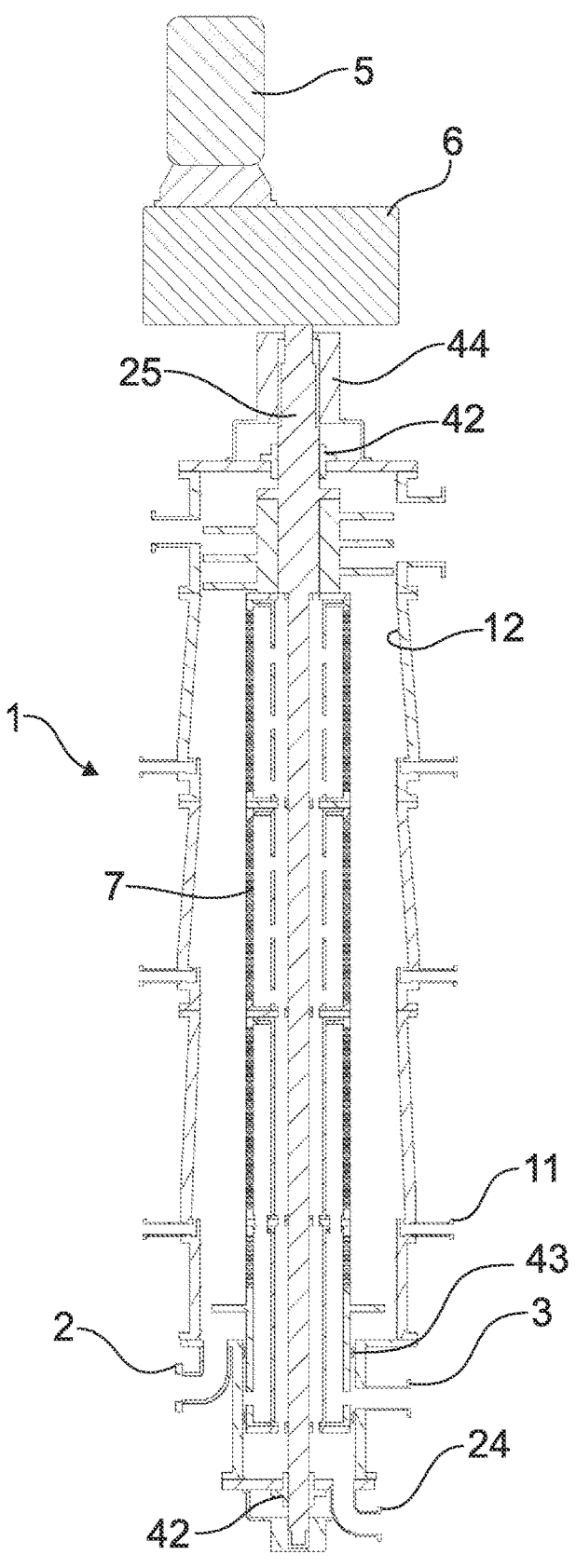
FIG. 1 illustrates as a simplified drawing an apparatus in accordance with at least some embodiments of the present invention.
Figure 2:
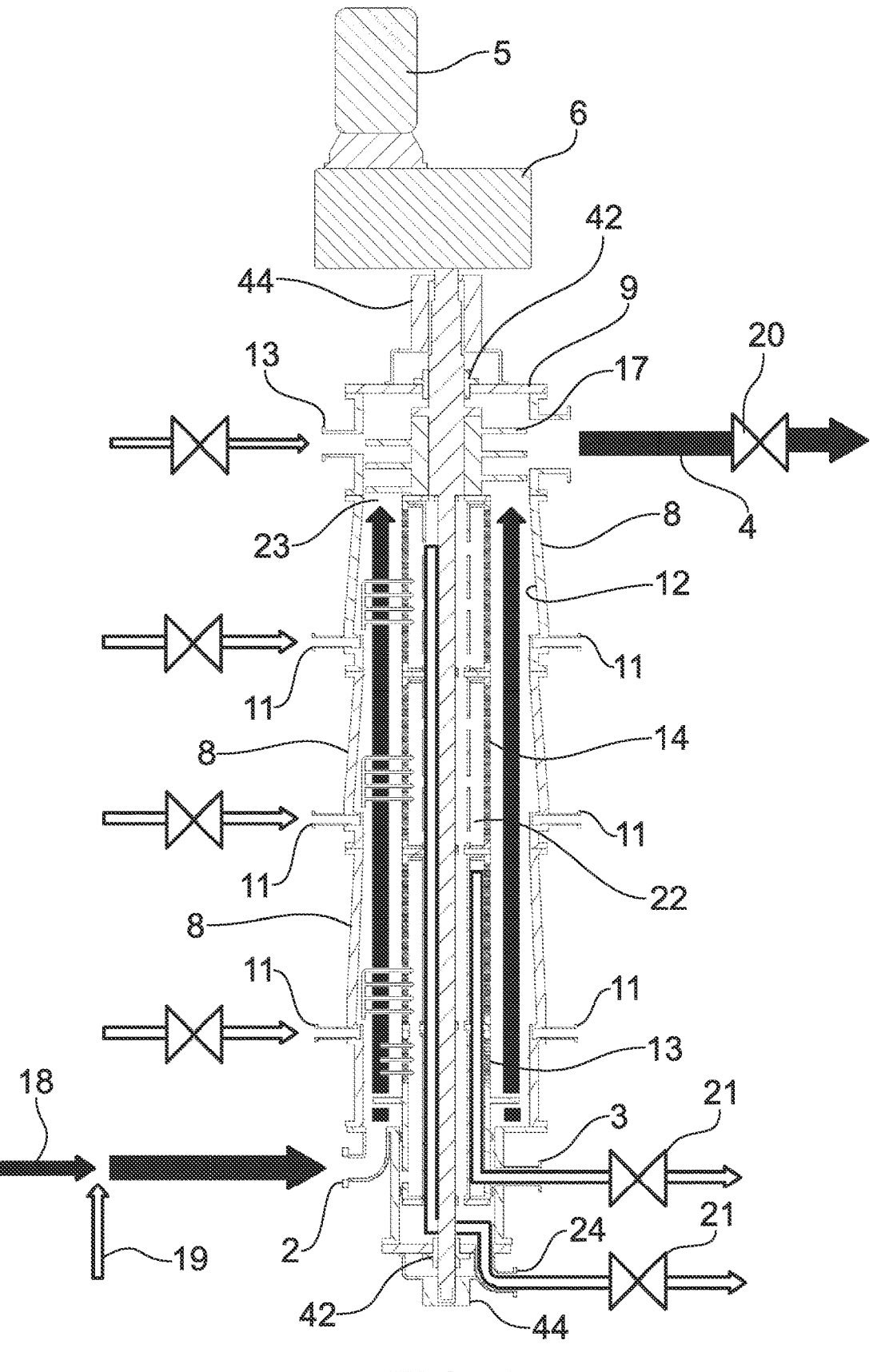
FIG. 2 illustrates some details of the apparatus of FIG. 1.

FIGS. 1 and 2 illustrate schematically an apparatus in accordance with at least some embodiments of the present invention. The purpose of these FIGS. 1 and 2 is to illustrate and explain the basic functional and structural principles if the invention. The apparatus is designed for dewatering and washing pulp.

The apparatus in FIGS. 1 and 2 is assembled on vertical casing 1 that forms the frame of the apparatus. Within the casing 1 is mounted a coaxial rotor 7 that is connected to an electric motor 5 by a gear box 6. As an alternative to the gear box 6 and an electric motor 5 any other drive actuators can be used. The gear box 6 is connected to an axle 25 of the rotor 7 through a bearing unit 44. The ends of the axle 25 extend through the casing 1 and are sealed with axle sealings 42.

Figure 10:
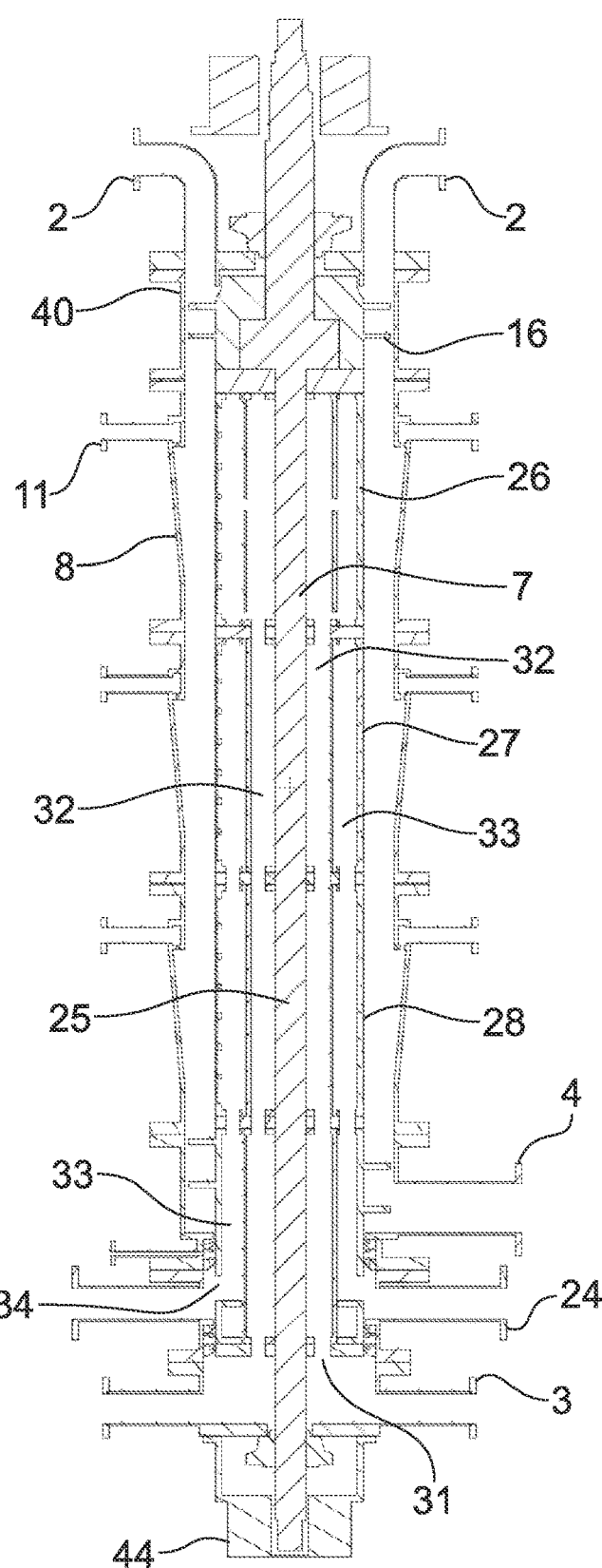
FIG. 10 illustrates an apparatus in accordance with at least some embodiments of the present invention.

An inlet 2 for feeding pulp and liquid mixture is placed at the bottom of the casing 1. The inlet 2 opens to a space formed between the inner wall 12 of the casing 1 and the outer surface of the rotor 7. This space forms an annular volume around the rotor 7. A first outlet 3 is placed on the casing 1 below the inlet 2. The first outlet 3 is used for removing filtrate, i.e. liquid extracted from the pulp/liquid mixture. The rotor 7 is sealed against the inner surface of the casing 1 by rotor sealings 43 to direct the liquid to the first outlet 3. If more liquid/filtrate outlets are used, the needed sectioning around the outlets is done by required number of rotor sealings 43. A second outlet 4 is placed on top of the casing 1 on an area at the top part of the rotor 7. The second outlet 4 is used for extracting pulp from the apparatus, more precisely from a space formed at the top of the rotor 7. In this example, the flow direction is from bottom to up. The flow direction is controlled by pressure difference between the inlet 2 and the second outlet 4. The pressure at the inlet 2, the first pressure, is the infeed pressure and provides the highest pressure level of the apparatus. The second outlet is configured to maintain pressure on a level that allows extraction of the pulp mixture and provides sufficient back-pressure (if needed) for the flow of the mixture in the space formed between the casing 1 and the rotor 7. The flow resistance of the pulp mixture causes also a force resisting the flow of the pulp mixture so that flow speed can be maintained at controlled level. As the main force driving the flow of the pulp mixture is pressure difference, the flow direction may be from bottom to up as described here, or from top to bottom as shown in FIG. 10.

The casing 1 is formed of casing modules 8 and a top part 9 and a bottom part 10. The inlet 2 and first outlet 3 are connected to the bottom part 10 and the second outlet 4 is connected to the top part 9. At least the casing modules 8 have a conical inner surface 12 that tapers upwards. The same tapering form can be used in top 9 and bottom 10 parts also, but especially the bottom part 10 may have a cylindrical inner surface. The casing modules 8 have wash filtrate inlets 11 located at the lower area of each casing module 8. The top part 9 has also a filtrate inlet 13 for feeding filtrate for pulp dilution. At the root of the rotor 7 are feeding pulp distributors 16 that divide the infed pulp to the surface surrounding the rotor 7. Discharging pulp distributors 17 are placed on top of the rotor 7 to ensure that pulp is discharged evenly and if dilution is used, to ensure good mixing.

FIG. 2 shows schematically the main flows and operation of the apparatus. A medium/consistency pulp/liquid mixture is pumped by a pump to the washer on first pressure $p_1$. This pulp infeed flow 18 is depicted by an arrow. If dilution of the pulp is needed, a pulp feed dilution filtrate 19 may be used to add liquid before feeding the mixture to the apparatus. The pulp/liquid mixture flows upwards in the apparatus in the space between the inner wall 12 of the casing 1 and the outer surface of the rotor 7. Pulp is pumped all the way through the apparatus and pressure difference between the inlet 2 and the second outlet 4 is the factor that moves the pulp. Pulp is fed to the apparatus from the bottom part 10 and washed pulp is taken out from the top part 9 (or vice versa, see FIG. 10). Pressure in the apparatus is controlled by the outcoming pulp line valve 20. Vertical setting of the apparatus, especially the casing 1 and the rotor 7 makes it possible to maintain the pressure difference and to obtain controlled flow of the pulp/liquid mixture.

During the operation of the apparatus, the rotor 7 is rotated. The rotation causes a centripetal force on surface of the rotor 7 forcing the solid particles (in this example pulp fibres) tangentially away from the rotating surface. This prevents the fibres from entering the holes 14 of the perforated outer surface 14 of the rotor 1. Simultaneously, the pressure used for feeding the pulp/liquid mixture pushes liquid through the holes 15 of the perforated outer surface 14 of the rotor 1. The rotary movement of the rotor 1 provides a liquid film over the rotor surface (perforated outer surface 14). This allows the liquid exciting from the pulp fibre and liquid mixture to flow freely to said liquid film. Therefore the flow is allowed everywhere over the volume of the fiber/liquid mixture to a large surface of the liquid film instead of single holes. This flow further enters from the liquid film to a space within the rotor 1. The first outlet 3 is connected to this space and filtrate can be let to flow out from the apparatus through said first outlet 3. Volume and pressure of the outflowing filtrate is controlled by outlet valve 21. The pressure at the inlet 2 and at the second outlet 4 is controlled so that solids in the mixture of solids and liquid is transferred upwards within the casing. The infeed pressure is higher than pressure at second outlet 4 and the pressure difference is controlled to adjust the residence time of the mixture in the apparatus. The flow and pressure control is performed by an outcoming pulp line valve 20. As mentioned before, same applies to an apparatus operating with from top to bottom flow.

If the apparatus is used only to increase the dry matter content of the infeed mixture, for example for dewatering, the above is the basic operating principle of the apparatus. In a washer mode, used for treating the pulp with a washing liquid, washing liquid has to be fed to the apparatus. The washing liquid is recycled and possibly, or at least partially, cleaned filtrate cycling with the washing cycle of the apparatus and the production line is provided. In such case wash filtrate is fed to the apparatus through wash filtrate inlets 11. Of course, other washing liquids may be used.

The apparatus of FIG. 2 has two washing stages. The washing stages are formed of superposed casing modules 8, each of which is equipped with at least one wash filtrate inlet 11. In the washing mode, when the pulp/liquid mixture is pumped through the inlet 2 into the apparatus, the pressure difference between the inlet and second outlet pushes the pulp fibres upwards. Simultaneously the liquid, which in this case is dilution or washing filtrate, flows inside the rotor 7 through the holes 15 on the perforated surface 14 of the rotor 7. The driving force in the liquid flow is pressure within the casing 1. When the pulp/liquid mixture enters the first washing stage, i.e. the lowest of the casing modules 8, wash filtrate is fed into the mixture through wash filtrate inlets 11. The number of the wash filtrate inlets 11 may vary, but for example equal enough distribution of the wash filtrate can be obtained by three inlets. For a very large apparatus, more inlets can be added. Now, when wash filtrate is added to the pulp/liquid mixture, the volume thereof is increased. The inner wall 12 of the casing module is formed as a truncated cone having its largest diameter at the bottom of the casing module 8 and tapering upwards. The wash filtrate inlet(s) is fitted on the bottom part of the casing module and opens to the part of the casing module wherein the space between the inner wall 12 of the casing module 8 and the perforated surface 14 of the rotor 7 is largest. As the pulp/liquid mixture is pushed upwards in the casing module, wash filtrate flows partially into the rotor and is removed through the outlet 3. The wash filtrate washes the pulp fibres as it flows through the fibre mass. At the next casing module 8 or washing stage the addition of the washing liquid, washing by the flow and removal of the liquid is repeated. The number of the washing stages (and casing modules) may be adjusted as needed in the manufacturing process.

Some of the features related to the operation of at least some embodiments of the invention are discussed below. The features relate mostly to the washer configuration or washing method.

1) Solids with liquid (for example pulp in 4-12% consistency mixed with liquid) is flowing continuously in vertical direction inside the apparatus between a rotating rotor (having a cylindrical shape) and solid/fixed frame (having a cylindrical or conical inner surface).

2. Pressure difference moves the pulp inside the apparatus. In the example configuration above solids with liquid is fed to bottom part of the apparatus and taken out in the top part. The operation is similar in the example configuration of FIG. 10, wherein the flow direction is from top to bottom.

3. Lower density material (liquid) outtake is done in horizontal direction continuously.

Lower density material (liquid) flows through the perforated outer surface of the rotor inside the rotor Lower density material (liquid) flows inside the rotor because of pressured difference 4. Rotating rotor (forming an inner cylinder (cylindrical surface) causes a centripetal force that enables higher density particles (solids, fibres, etc.) to flow inside the rotor and same time lower density material (liquid) is able to flow inside the rotor.

For lower density material: centripetal force<force caused by pressure difference→lower density material is able to flow inside the rotor For higher density material: centripetal force>force caused by the pressure difference→higher density material is unable to flow inside the rotor 5. Equipment can be used to:

Thickening (for example: removing free liquid from pulp)

Washing—wash liquid (filtrate) can be added from the fixed frame (casing)→radial displacement towards rotating rotor continuously Depending on rotor concept it is possible to have several washing stages Separating higher density particles from the liquid At least some embodiments of the invention provide a new way of getting filtrate from pulp/liquid mixture. For example, faster thickening and liquid displacement, compact size of washing equipment combined with higher production volume can be obtained. The mechanical structure is cheaper in relation to the output in relation to the existing apparatuses. A modular structure may be used, which leads to easier and cheaper manufacturing, whereby the apparatuses provide a good solution for the existing mills in replacement and development investments. Designing and building new effective factories is facilitated as well as construction of washers with increased capacity cost effectively.

The principles of removing liquid from the liquid pulp/mixture are described below. Most of the principles apply to other solids/liquid mixtures also, some are specific to pulp fibre suspensions.

The casing 1 is a static part. Functionally, the static part is the inner wall 12 of each casing module 8 or inner surface of a bottom part 10 or top part 9. The rotor 7 has a perforated outer surface 14 that encloses a filtrate section 22. The space between the inner wall 12 and the perforated outer surface 14 of the rotor 7 forms a pulp section 23. The pressure in the filtrate section 22 is lower than the pressure in the pulp section 23. This causes the filtrate to flow from the pulp/ liquid mixture to the filtrate section. The pressure in the filtrate section is controlled by the outlet valve 21 in the first outlet 3.

The force caused by the pressure difference between the pulp section 23 and the filtrate section 22 pushes the material to filtrate section 22. The holes 15 in the perforated outer surface 14 have a relatively small size because the perforated outer surface 14 of the rotor 7 operates also as a screen blocking the solid particles like pulp fibres. A friction force is caused by flow speed in the holes. It partially effects the force balance of the various flows. Further, the rotor 7 is rotated in the pulp/liquid mixture. The rotational speed can be varied or adjusted as needed, but as an example the rotational speed may be 200-600 rpm. The rotational speed and the speed of the perforated outer surface 14 causes a centripetal acceleration and force that is opposite to the force caused by the pressure difference.

When balance of the above mentioned forces is considered, it can be deducted that:

The higher the speed that the rotor is rotated, the higher centripetal force is achieved, the higher the density, the higher the mass for a defined volume, the rotor has to be rotated at a speed that creates a force that enables liquid to pass the surface holes but blocks entry of the fibres (solids).

In conclusion, at higher rotational speed of the rotor more filtrate can be got out from the pulp/liquid mixture without getting fibres to the filtrate section.

One further phenomenon that affects the filtration or separation process is bonding of the pulp fibres. Basic feature of paper- and board manufacturing and producing other solid products of pulp is forming of fibre bonds between fibres, these bonds keep the structure of product coherent. Building of bonds begins in medium consistency pulp mixtures and in such conditions pulp fibres start to build a net. This phenomenon keeps the individual fibres in the net and resists separation of the fibres to the flow. When washing filtrate is pushed through the pulp mixture, the flow on liquid tends to separate fibres, but the bonding tends to keep them together. In washing stage centripetal force caused by the rotating rotor 7 pushes the fibres radially outwards and as consistency increases, the fibres start to build a net. However, the pressure difference pushes liquid through the net and simultaneously washes the fibre mass. On the surface of the rotor a layer wherein the number of fibres is very low and mostly liquid is present is formed between the perforated outer surface of the rotor and the pulp cake formed by bonding and netting. Because of this, very few fibres pass through this layer and filtrate passing to filtrate section 22 is clean from fibres. This layer, wherein mostly only liquid is present, forms a collection volume for liquid. The liquid flowing through the fibre mass can flow freely to said layer everywhere from the liquid/fibre mass or cake. Liquid is further collected to the holes of the perforated surface, but because of the liquid collection layer, the flow from the cake is not limited to the location of the openings of the holes only. The pulp cake is passed upwards by pressure difference between the inlet 2 and the second outlet 4. As the pulp cake travels forward, washing liquid keeps passing through the cake washing the fibres in the cake effectively.

Pulp washing in the above described apparatus uses two washing principles, diffusion by adding liquid to the mixture and displacement wherein dirty liquid is pushed from the mixture by displacement liquid (washing filtrate). Diffusion occurs at feeding stage wherein the pulp infeed dilution filtrate 19 is added to pulp infeed flow 18. Displacement washing occurs at washing stages wherein wash filtrate is pushed through the fibre mass or cake from the inner wall 12 of the casing modules 8. Wash filtrate is fed over all the length of the casing module and it displaces liquid in the pulp pushing it to filtrate section 22. The wash filtrate is distributed over the length of the casing module along inner wall because of the conical shape that allows a liquid flow between the inner wall and the pulp cake. Further dilution occurs at top section 9 if wash liquid or other liquid is mixed to the washed pulp to adjust its consistency.

FIGS. 3-7 depict an apparatus according to at least some embodiments of the invention. These FIGURES show further details of the embodiments.

Figure 3:
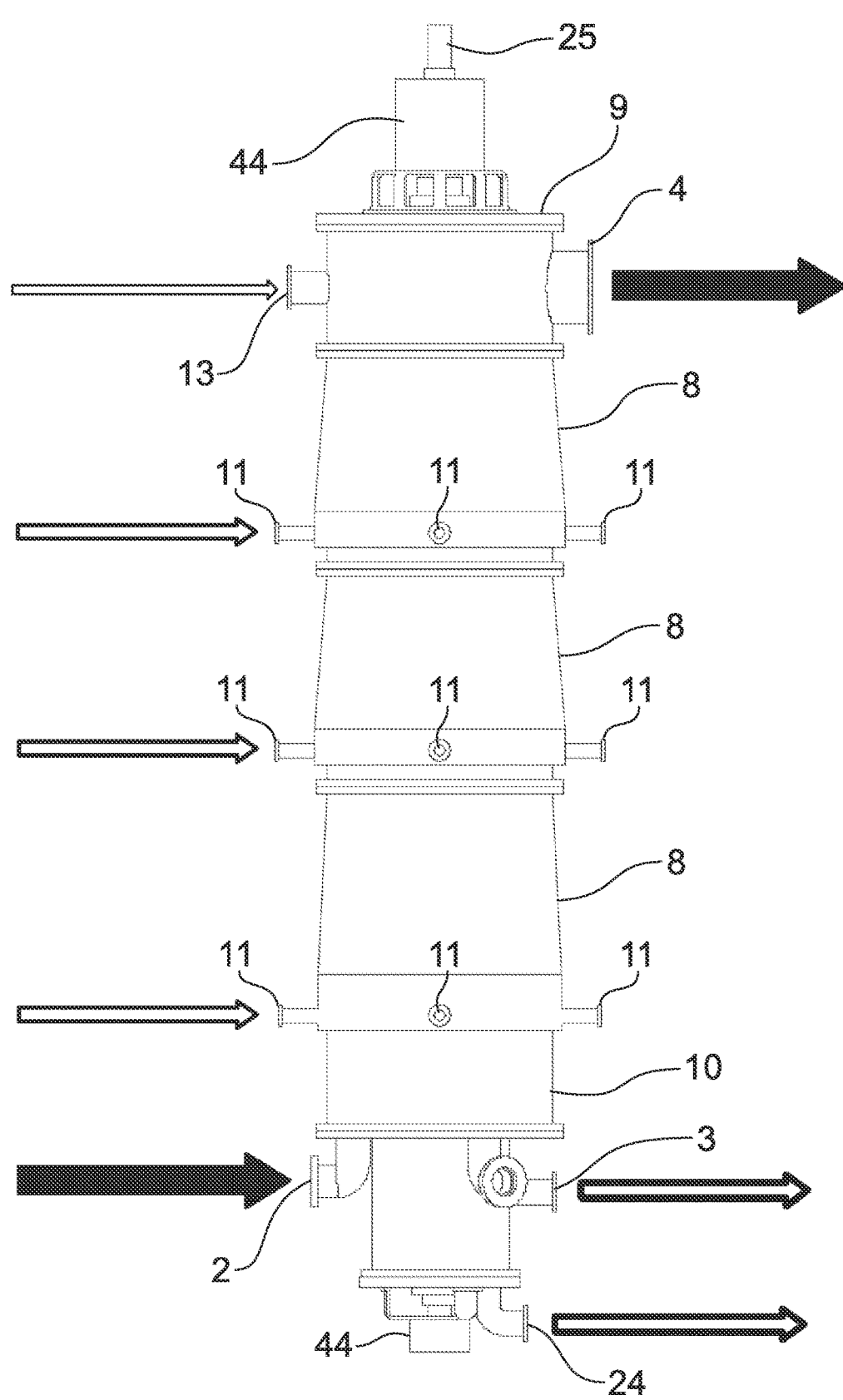
FIG. 3 illustrates an example apparatus capable of supporting at least some embodiments of the present invention.

The apparatus shown in FIG. 3 comprises five main sections, the lowest part is a bottom part 10. This part includes an inlet 2 for pumping in pulp/liquid mixture. The number of the inlets 3 may vary, but in this case three inlets are used. The consistency of the pulp is about 5.5-8.5% DMC (Dry Matter Content). Further, the bottom part 10 includes two outlets, a first outlet 3 and a third outlet below it. These outlets are used for removing filtrate from the apparatus. On top of the bottom part 10 is three superposed casing sections 8. Each of the casing sections 8 have wash filtrate inlets 11. In this case the number of the inlets is four, more inlets may be used for more even distribution or for larger apparatuses and correspondingly three or even less wash filtrate inlets 11 may be needed for smaller apparatuses or for constructions including different distributing mechanisms. Washing is performed in four stages, in bottom part 10 and in three superposed casing sections 8. The pulp/liquid mixture pumped into the bottom part includes the liquid. To the lowest casing section (second washing stage) washing liquid is pumped through wash filtrate inlets 11. At the second washing stage the filtrate may be fresh or filtrate form the succeeding washing stages. The third and fourth washing stage usually use fresh filtrate. Finally, discharge dilution and flushing may be performed by adding fresh filtrate to the top part 9 through fresh filtrate inlet 13. Washed pulp is discharged through one (or more) outlet(s). The discharged pulp has a consistency of 10-11% DMC, for example.

Figures 4, 5:
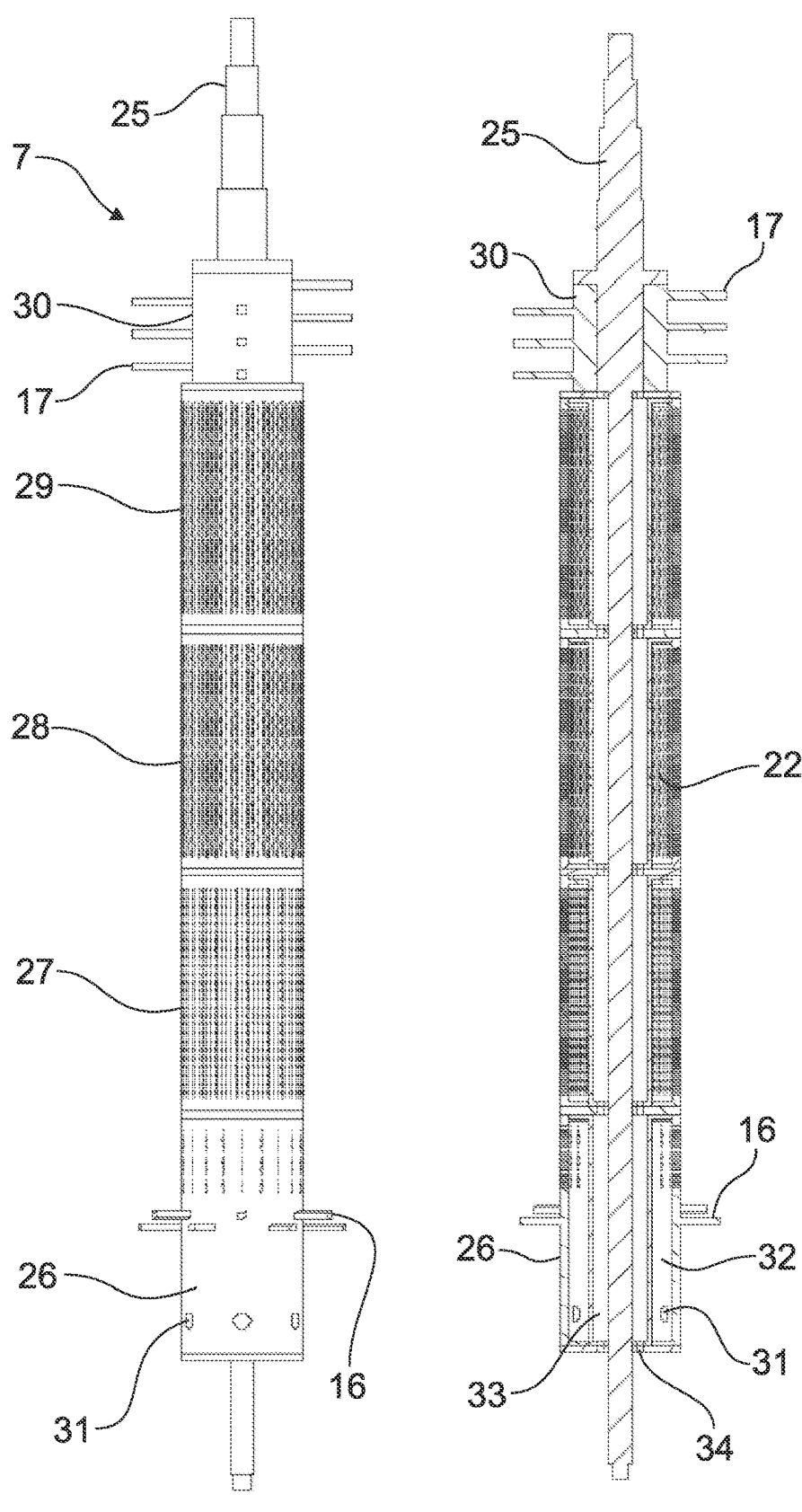
FIG. 4 illustrates an example rotor supporting at least some embodiments of the invention.
FIG. 5 is a cross section of the rotor of FIG. 4.

FIGS. 4 and 5 show a rotor 7 for the apparatus in FIG. 3. The rotor 7 has five sections that correspond to the sections of the apparatus formed by bottom part 10, casing sections 8 and the top part 9. The rotor 7 is built on a central axle 25. The first rotor section 26 comprises first outlet holes 31 for discharging filtrate from the filtrate section 22 of the rotor 7, feeding pulp distributors 16 above said first outlet holes 32 and holes 15 for inflow of the filtrate to the filtrate section 22. The first rotor section 26 builds an infeed, thickening and filtrate outlet section. The feeding pulp distributors divide the flow from 3 inlets evenly over the cylindrical space. The blades of the distributor are set in an angle to perform a pumping effect aiding the flow of pulp/liquid mixture upwards.

The second rotor section 27 has a perforated outer surface 14 and this section performs as further thickening section and as first washing section. The filtrate section behind the perforated outer surface 14 of the second rotor section is sealed from the filtrate sections of the superposed rotor sections and forms a first filtrate subsection 32. The third and fourth rotor sections 29, 30 have a second filtrate subsection 33 behind their perforated outer surface 14. The third and second rotor sections operate as washing sections or stages. The fifth section is a discharge section and has discharging pulp distributors 17.

The perforated outer surface of the rotor sections 26-29 is formed of hole baskets. The first rotor section 26 has holes 15 only at top part above the feeding pulp distributors 16. The hole baskets and hole distribution thereof can be made in several various ways. One example is given further below.

Figure 6:
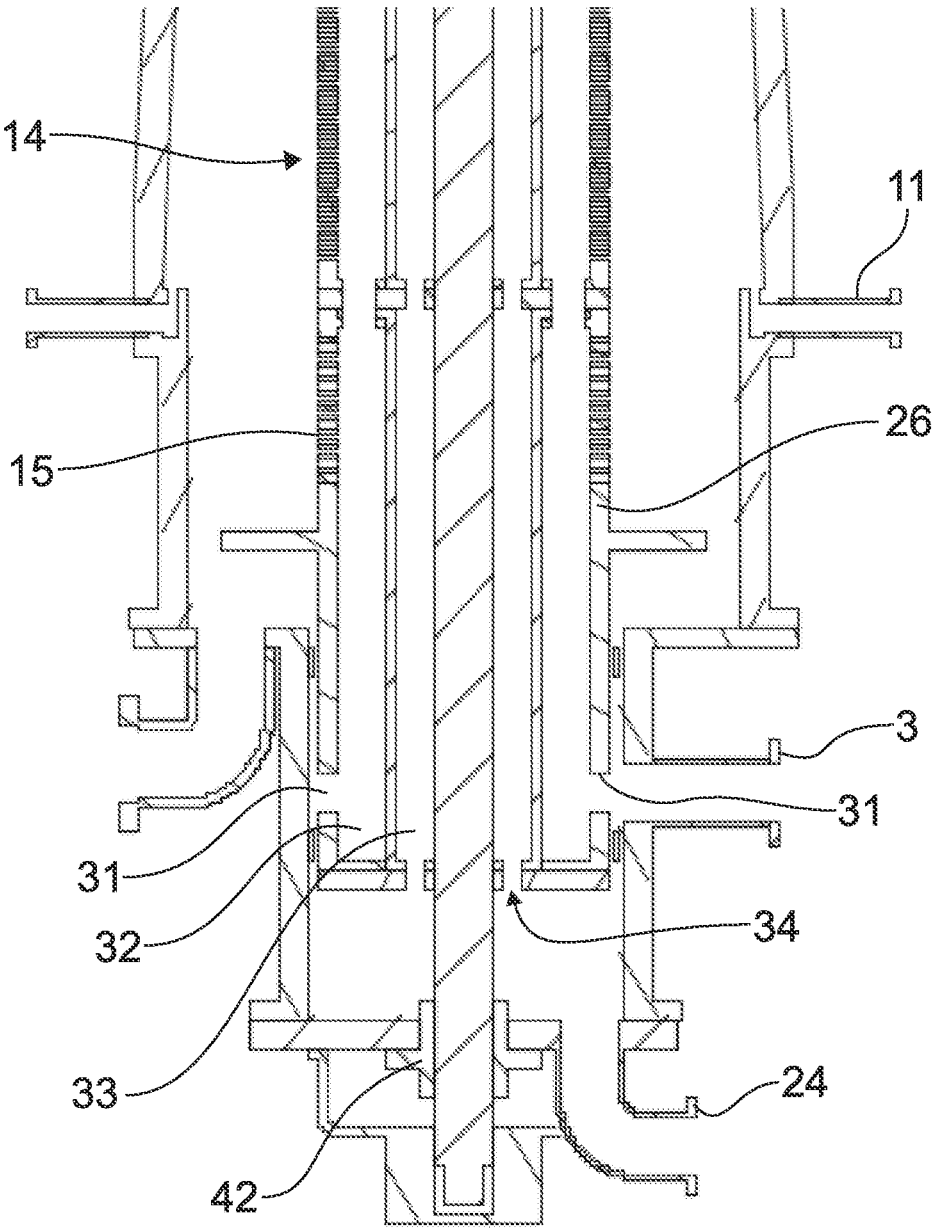
FIG. 6 illustrates a detail of the apparatus of FIG. 3.

FIG. 6 shows the bottom part and the root of the rotor 7 in further detail. The first rotor section has two filtrate subsections. The first filtrate subsection 32 is placed in radial direction behind the perforated outer surface 14 and extends behind the perforated outer surface of the first rotor section 26 and the second rotor section 27 to the top of the second rotor section 27, wherein it is sealed or closed. The first filtrate subsection 32 opens through first outlet holes 31 to an outlet space that opens to first outlet. This design allows discharge of filtrate from first and second rotor sections 26, 27 separately from the filtrate from third and fourth rotor sections 28, 29. The second filtrate subsection 33 extends between the first filtrate subsection 32 and the axle 25 to the third rotor section 28 and opens to the space between the perforated outer surface 14 of the third and fourth rotor sections 28, 29 and the axle 25. The second outlet hole 34 connects the second filtrate subsection 33 to a space connected to the third outlet 24 for discharging filtrate from third and fourth rotor sections 28, 29. The holes 14 of the first rotor section 26 and the second rotor section 27 are connected to the first filtrate subsection 36 and the holes 14 of the third rotor section and the fourth rotor section 29 are connected to the second filtrate subsection 33.

The outer surface 14 of the rotor sections is formed of hole baskets. The structure of the rotor sections is different in different parts of the apparatus. The filtrate is taken to filtrate section 22 (32, 33) from the pulp/liquid mixture through the holes in the hole basket. The hole baskets are a part of the modular rotating rotor concept. The centripetal force caused by the rotating rotor and density difference (fibre density is greater than liquid density) enable filtrate to flow to the filtrate section 22 of the rotor 7 without letting the fibres pass through the holes 15.

Figure 7:
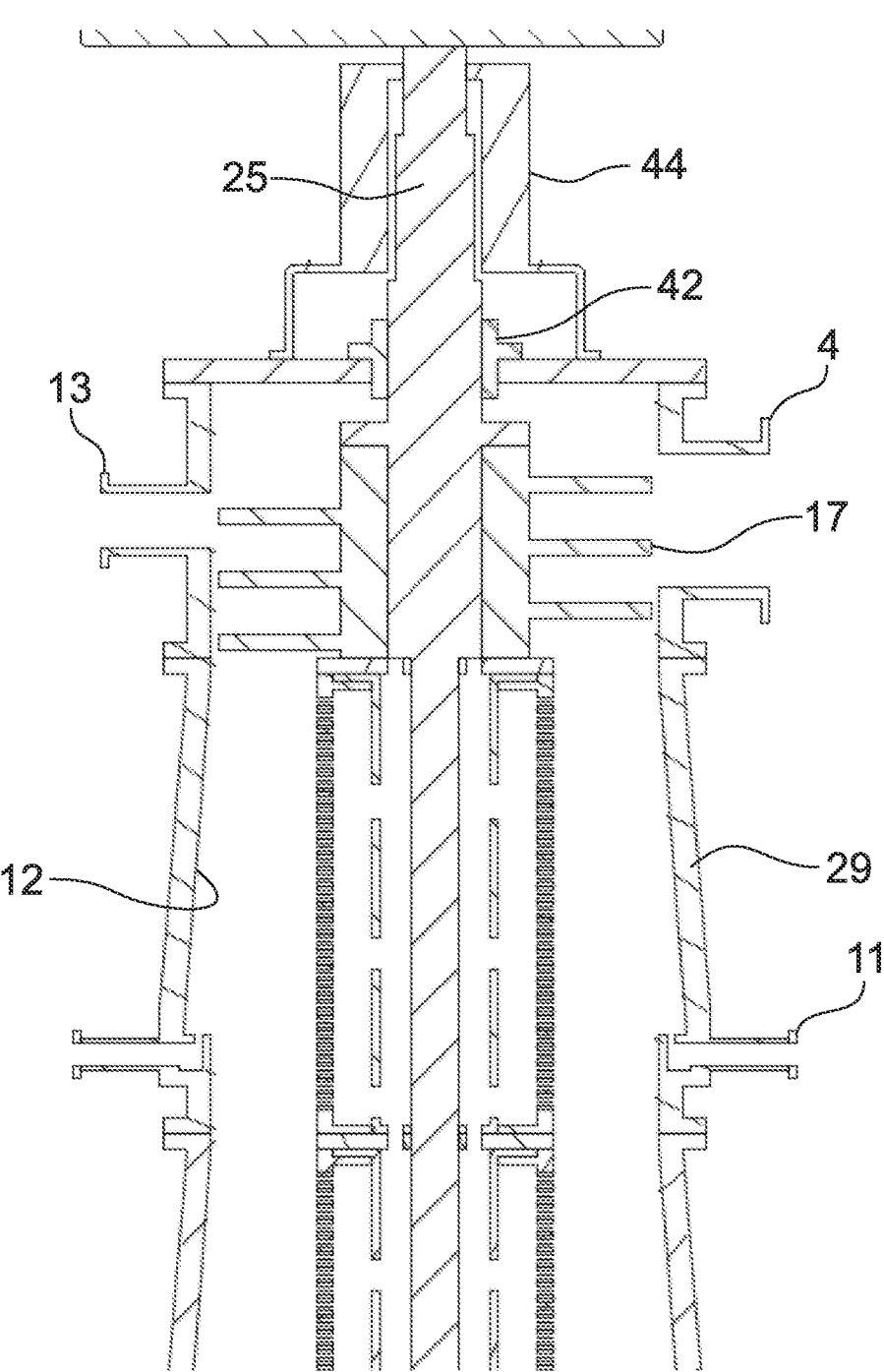
FIG. 7 illustrates a detail of the apparatus of FIG. 3.

FIG. 7 shows the top part. The filtrate inlet 13 allows addition of fresh filtrate and mixing chemicals needed at succeeding stages. Discharging pulp distributors 17 ensure that the pulp is discharged evenly. If dilution or mixing of chemicals is needed, these ensure thorough mixing.

In the apparatus pulp goes all the way from the bottom to top (or from top to bottom). Normal pulp pressure is 2.5-3 bar and normal washing filtrate inlet pressure is 4-5 bar. In the example apparatus above washing will be done in 4 phases:

Phase 1: Pre-thickening (dilution-thickening)
Phase 2: Washing (displacement-thickening)
Phase 3: Washing (displacement washing)
Phase 4: Washing (displacement washing)

In bleaching thickening can be done in all phases. The higher the pulp goes in the apparatus, the higher the consistency. Target consistency is 11% at the top In brown stock washing thickening can be done in phases 1 and 2. Rest of the stages are for displacement washing.

As can be seen from the above description and FIGURES, the phases correspond with the casing sections and correspondingly the rotor sections. One can easily understand the modular construction principle of the apparatus.

The hole distribution and hole sizes in hole baskets forming the perforated outer surface 14 of the rotor sections may be varied. However, a continuous and evenly distributed flow of liquid is one target guiding the design. In the apparatus the pulp/liquid mixture, pulp flows continuously upwards by pressure difference between inlet and second outlet. Free liquid flows horizontally from the pulp section to the filtrate section. The horizontal flow of liquid should preferably be evenly distributed. This can be achieved by arranging the holes 15 in continuous series in vertical direction. Now, for example, if the rotor 7 is rotating at 300 rpm (5 rounds per second) and partition of the holes is 18°, then in every vertical position a hole 15 meets a certain point in horizontal position every 0.01 seconds. This provides continuous flow through the pulp cake and prevents a spot or localized flow at a position of a single hole. This further leads to evenly distributed fibre mass having consistent density. This promotes quality of the washed pulp.

Figure 8:
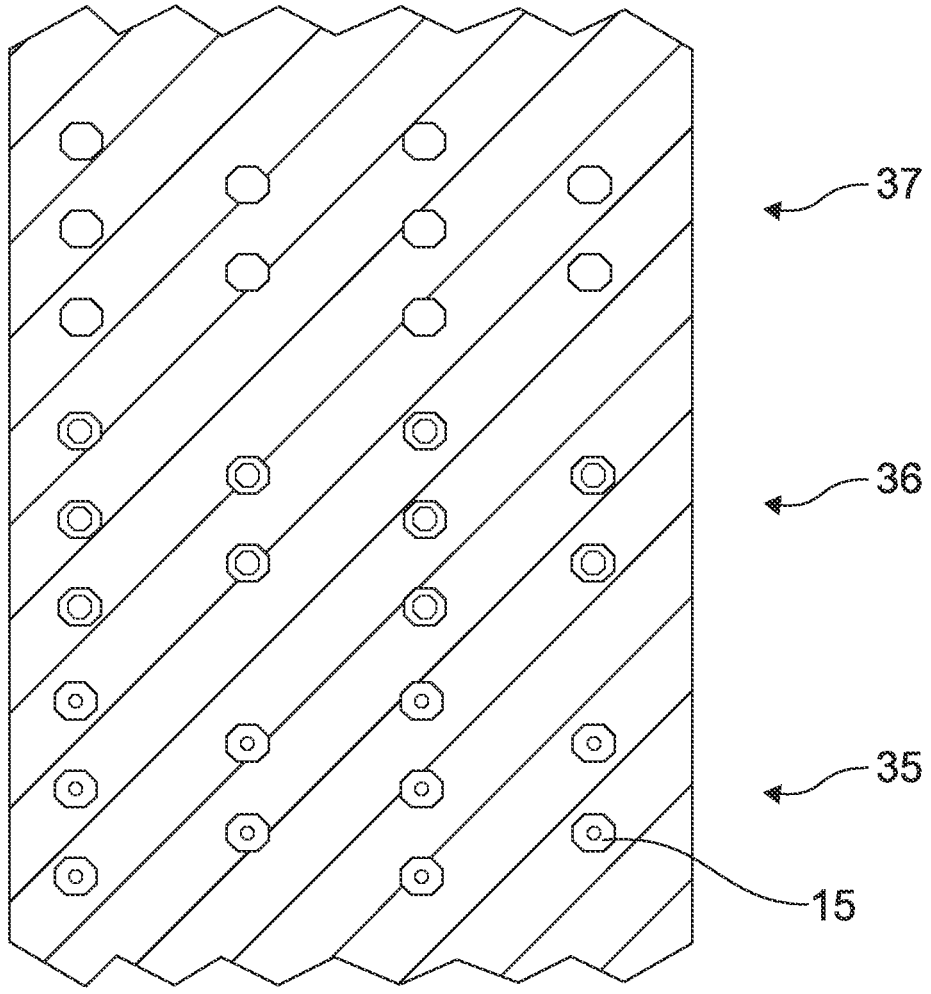
FIG. 8 illustrates schematically a detail supporting at least some embodiments of the invention.
Figure 9:
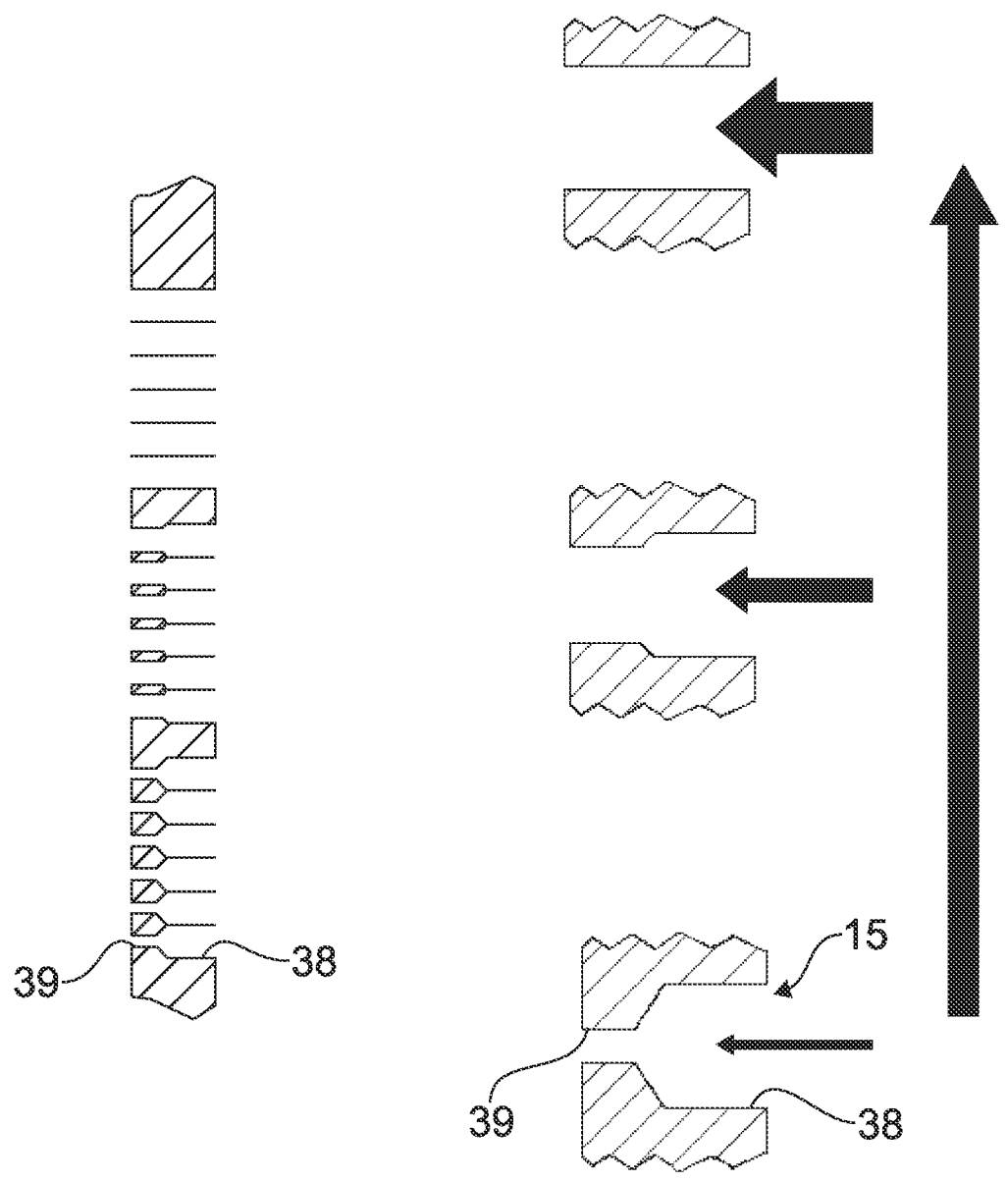
FIG. 9 illustrates schematically a detail supporting at least some embodiments of the invention.

The outer surface 14 of the rotor sections used for washing, an evenly distributed flow can be enhanced by dividing the perforated outer surface 14 of the rotor 15 to zones. The hole distribution and hole sizes vary in these zones. One example of the hole distribution is depicted in FIGS. 8 and 9.

In the first zone 35:
Hole diameter: the holes 15 comprise a countersunk hole 38 at the outer surface placed towards the pulp section 23 and a through hole 39 leading from the countersunk hole 38 to filtrate section 22. The diameter of the countersunk hole 38 is 5 mm and the diameter of the through hole 39 is 3 mm. The partition between the holes 15 is 36°, the height of the zone 300 mm, hole distance (horizontal): 157 mm and hole distance (vertical) 5 mm. Number of the holes: 600 and open area: 0.0042 m2

In the second zone 36:
Hole diameter: countersunk: 5 mm, through: 4 mm, partition: 24°, height of the zone: 300 mm, hole distance (hor.): 105 mm, hole distance (vert.): 5 mm, number of holes: 900, open area: 0.0113 m In the third zone 37:
Hole diameter: countersunk: 5 mm, through: 5 mm, partition: 18°, height of the zone: 300 mm, hole distance (hor.): 79 mm, hole distance (vert.): 5 mm, number of holes: 1200, open area: 0.0236 m2

One screen module or hole basket of 1000 mm comprises three different zones 35, 36, 37.

It can be contemplated that the screen modules or hole baskets of the rotors are constructed differently from the example above. The holes may have different shapes and configurations or partially or wholly replaced by slots. The screen module may be formed of parallel longitudinal slats forming slots between the slats. However, as the pulp fibers have longitudinal shape, longitudinal shapes of holes or slots may allow fibres to enter the slots and pass the perforated surface or block the slots. In summary, the perforations formed of holes, slots or alike provide flow connection to the inner volume of the rotor.

The liquid goes where it can go most easily. In the lower part of the perforated outer surface 14 of the rotor section 28, 29 or hole basket the hydrostatic pressure is higher. The target is to get a constantly growing flow volume of the liquid when pulp is travelling upwards in the apparatus. Therefore, there is need to limit flow rate from the bottom part. One example of achieving this is described above.

FIG. 10 depicts an apparatus wherein the flow of pulp/liquid mixture is arranged from top to bottom. The apparatus comprises two inlets 2 at the top of the apparatus. These are configured to feed pulp/liquid mixture to feeding pulp distributors 16 located inside a top casing 40. The pulp feeding distributors are used to disintegrate the pulp mass and may be configured to provide a pumping action for driving the pulp/liquid mixture. Below the top casing 40 are three casing modules 8 and inside them associated rotor sections 26-28. The first rotor section has flow connection to a first filtrate subsection 32, that connects to first outlet 3 at the bottom of the apparatus at the root of the rotor 7. Second 27 and third 28 rotor sections have flow connection to a second filtrate subsection 33 that connects to a third outlet 24. This allows extraction of washing liquid at different impurity levels, as described also above.

The operation principles and design options described in relation to FIGS. 1-9 apply to the apparatus of FIG. 10 and vice versa.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", i.e. a singular form, throughout this document does not exclude a plurality.

INDUSTRIAL APPLICABILITY

The invention may be used in industrial processes requiring treatment of mixtures of solids and liquids, for example in dewatering pulp, washing pulp fibers or separating lye from liquids.

REFERENCE SIGNS LIST

1 casing
2 inlet
3 first outlet
4 second outlet
5 electric motor
6 gear box
7 rotor
8 casing module
9 top part
10 bottom part
11 wash filtrate inlet
12 inner wall
13 filtrate inlet
14 perforated outer surface
15 hole
16 feeding pulp distributors
17 discharging pulp distributors
18 pulp infeed flow
19 pulp feed dilution filtrate
20 outcoming pulp line valve
21 outlet valve
22 filtrate section
23 pulp section
24 third outlet
25 axle
26 first rotor section
27 second rotor section
28 third rotor section
29 fourth rotor section
30 fifth rotor section
31 first outlet holes
32 first filtrate subsection
33 second filtrate subsection
34 second outlet hole
35 first zone
36 second zone
37 third zone
38 countersink hole
39 through hole
40 top casing
41 -
42 axle sealing
43 rotor sealing
44 bearing unit

CITATION LIST

Patent Literature

U.S. Pat. No. 3,241,676

The invention claimed is:

1. An apparatus for treating a mixture of one or more liquids and one or more solids, the apparatus comprising:

a casing, and a rotor mounted inside the casing and having an inner volume delineated by an outer surface provided with flow connections to the inner volume and configured to be rotated within the casing, wherein:

the casing and the rotor are set in a vertical position, the casing comprises casing modules and the rotor comprises rotor modules, the lengths of the casing modules and the rotor modules correspond with each other, the rotor modules are configured as straight cylinders, and the casing modules have an inner wall formed as a cut cone that tapers in the direction of lower pressure.

2. The apparatus according to claim 1, wherein the casing and the outer surface of the rotor form an annular volume around the rotor.

3. The apparatus according to claim 1, further comprising:

an inlet configured for feeding a mixture to be treated into the casing at a first pressure, a first outlet configured for removing liquid to be treated from the casing at a pressure lower than the first pressure, and a second outlet configured for removing a fraction comprising solids at a pressure lower than the first pressure.

4. The apparatus according to claim 3, further comprising at least one wash filtrate inlet spaced at a distance from the inlet.

5. The apparatus according to claim 1, wherein the rotor further comprises rotor modules comprising at least two modules selected from the group consisting of a pre-thickening module, a washing module, a combined thickening and washing module, and combinations thereof.

6. The apparatus according to claim 1, wherein the rotor comprises at least two superposed washing modules.

7. The apparatus according to claim 6, further comprising a first filtrate subsection connected to a first rotor section by a flow connection, wherein the first filtrate subsection is connected to a first outlet and at least one further filtrate section is connected to at least one further rotor section by a flow connection and is connected to at least one further outlet.

8. The apparatus according to claim 1, further comprising feeding pulp distributors configured to disintegrate a pulp mass and optionally configured to provide a pumping action for driving a pulp/liquid mixture.

9. The apparatus according to claim 5, wherein the number of the flow connections in the rotor modules increases from an area of greater pressure towards an area of lower pressure of the rotor modules.

10. The apparatus according to claim 1, wherein the apparatus further comprises a first filtrate subsection and a second filtrate subsection, and wherein the rotor comprises a first, second, third, and fourth rotor section, and wherein the holes of the first rotor section and the second rotor section are connected to the first filtrate subsection, and the holes of the third rotor section and the fourth rotor section are connected to the second filtrate subsection.

11. A method for treating a mixture of one or more liquids and one or more solids, comprising:

feeding said mixture inside a vertical casing, rotating a vertical rotor having a perforated outer surface within the casing, removing liquid from the mixture through the rotor, and removing a fraction comprising solids from the casing, wherein the casing comprises casing modules and the rotor comprises rotor modules, the lengths of the casing modules and the rotor modules correspond with each other, the rotor modules are configured as straight cylinders, and the casing modules have an inner wall formed as a cut cone that tapers in the direction of lower pressure.

12. The method according to claim 11, wherein the one or more solids in the mixture are transferred within the casing by a pressure difference between an inlet and an outlet.

13. The method according to claim 11, wherein the liquid is removed from the mixture in a filtrate section inside the rotor by a pressure difference between the pressure within the casing and the pressure within the rotor.

14. The method according to claim 11, wherein liquid is removed from the mixture as at least two separate flows.

15. The method according to claim 11, wherein the mixture is disintegrated after feeding into the casing.

16. The method according to claim 11, further comprising at least two washing stages.

17. An apparatus for treating mixtures of liquids and solids, comprising:

a casing having an inner wall, and a rotor mounted inside the casing and having an inner volume delineated by an outer surface provided with flow connections to the inner volume and configured to be rotated within the casing, wherein the casing and the rotor are set in a vertical position, an inlet configured for feeding the mixture to be treated into the casing at a first pressure, a first outlet configured for removing liquid from the mixture to be treated from the inner volume of the rotor at a pressure lower than the first pressure, a second outlet configured for removing a fraction comprising solids at a pressure lower than the first pressure, and at least one wash filtrate inlet at a distance from the inlet configured for feeding the mixture to be treated, and for pushing wash filtrate through the mixture to be treated from the inner wall of the casing and displacing liquid in the mixture to be treated and pushing it to a volume formed inside the rotor, wherein the casing comprises casing modules and the rotor comprises rotor modules, the lengths of the casing modules and the rotor modules correspond with each other, the rotor modules are configured as straight cylinders, and the casing modules have an inner wall formed as a cut cone that tapers in the direction of lower pressure.

* * * * *